United States Patent [19]

Raistrick et al.

[11] 4,405,416
[45] Sep. 20, 1983

[54] MOLTEN SALT LITHIUM CELLS

[76] Inventors: Ian D. Raistrick, Menlo Park; Jaime Poris, Portola Valley; Robert A. Huggins, Stanford, all of Calif., granted to U.S. Department of Energy under the provisions of 42 U.S.C. 2182

[21] Appl. No.: 302,337

[22] Filed: Sep. 15, 1981

Related U.S. Application Data

[62] Division of Ser. No. 170,254, Jul. 18, 1980, Pat. No. 4,315,059.

[51] Int. Cl.³ .................. C25C 3/02; H01M 6/36; H01M 8/14
[52] U.S. Cl. .................. 204/68; 429/16
[58] Field of Search .................. 204/68; 429/112, 16, 429/188

[56] References Cited

U.S. PATENT DOCUMENTS

| | | | |
|---|---|---|---|
| 3,558,452 | 1/1971 | Svadlenak | 204/68 |
| 3,560,263 | 2/1971 | Swinkels | 204/68 |
| 4,156,635 | 5/1979 | Cooper et al. | 204/68 |
| 4,200,686 | 4/1980 | Fletcher | 204/68 |

Primary Examiner—Howard S. Williams
Attorney, Agent, or Firm—Harold M. Dixon; Roger S. Gaither; Richard G. Besha

[57] ABSTRACT

Lithium-based cells are promising for applications such as electric vehicles and load-leveling for power plants since lithium is very electropositive and light weight. One type of lithium-based cell utilizes a molten salt electrolyte and is operated in the temperature range of about 400°–500° C. Such high temperature operation accelerates corrosion problems and a substantial amount of energy is lost through heat transfer. The present invention provides an electrochemical cell (10) which may be operated at temperatures between about 100°–170° C. Cell (10) comprises an electrolyte (16), which preferably includes lithium nitrate, and a lithium or lithium alloy electrode (12).

3 Claims, 2 Drawing Figures

MOLTEN SALT LITHIUM CELLS

The United States Government has rights in this invention pursuant to Contract No. EC-77-S-02-4506 between the United States Department of Energy and Stanford University.

This is a division of application Ser. No. 170,254, filed July 18, 1980 now U.S. Pat. No. 4,315,059.

BACKGROUND OF THE INVENTION

1. Field of the Invention this invention relates generally to cells, such as electrochemical cells, in which lithium is the active species, and more particularly to electrochemical cells having a molten salt electrolyte.

2. Prior Art

There is a great deal of current interest in better methods for energy storage. This is especially important for applications such as electric vehicles and the large scale storage of electric energy to level the load of stationary power plants. It does not appear that major improvements in important parameters, such as the amount of energy stored per unit weight or volume, at reasonable costs, can be expected from systems that employ aqueous electrolytes.

One of the developments currently being pursued involves a lithium-based cell, in which the negative electrode is a lithium alloy (typically either lithium-aluminum or lithium-silicon), the positive electrode is an iron sulfide, and the electrolyte is a molten salt, such as the eutectic composition in the lithium chloride-potassium chloride system. Because of the high melting point of such salts, such cells must be operated in the temperature range 400-500 degrees centigrade.

This requirement to operate at such high temperatures has several important disadvantages. One of these is that various degradation processes, such as corrosion of the cell container, seals, and other components are accelerated by such high temperatures. Another is that a substantial amount of energy is lost through heat transfer to the surroundings. Another is that the voltage obtained from such cells is lower at elevated temperatures, due to the fundamental property of the negative temperature dependance of the free energy of the cell reaction. Furthermore, the higher the temperature of operation, the greater the potential problems related to damage to the cell during cooling to ambient temperature and reheating, whether deliberate or inadvertent. Differences in thermal expansion, as well as dimensional changes accompanying phase changes, such as the freezing of the molten salt, can cause severe mechanical distortions, and therefore damage to cell components.

Accordingly, it would be advantageous to have cells of this type that operated at lower temperatures, particularly where the temperature of operation is near the boiling point of water, e.g., 100-150 degrees centigrade, rather than ambient temperature, as it would be easier to maintain the desired temperature by either heating or cooling.

Cells involving a lower temperature molten salt electrolyte have been investigated where the molten salt is based upon a solution of aluminum chloride and an alkali metal chloride. However, such salts are not stable in the presence of the respective alkali metals. As a result, an auxiliary solid electrolyte must be used to separate the alkali metal and the salt. One example of such a cell involves a molten sodium negative electrode, a solid electrolyte of sodium beta alumina, a molten aluminum chloride-sodium chloride salt, and either antimony chloride or an oxychloride dissolved in the chloride salt as the positive electrode reactant.

Such a cell can operate in the temperature range 150-250 degrees centigrade. It has the disadvantage of having to employ the solid electrolyte, which increases the cell impedance, as well as adding to the cost and complexity.

SUMMARY OF THE INVENTION

It is an object of the present invention to reduce the required temperature of operation of electrochemical cells employing molten salt electrolytes.

It is another object that an electrochemical cell be insensitive to the presence of impurities in an electrolyte thereof and that the electrolyte presents no special chemical or biological hazards.

It is a further object of the present invention that an electrolyte for an electrochemical cell has a wide electrochemical stability range, and that a wide variety of different electrode materials may be employed.

Additional objects, advantages and novel features of the invention will be set forth in part in the description which follows, and in part will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the cell of this invention may comprise an electrode including lithium, an electrolyte disposed about the electrode, an interface between the electrode and the electrolyte, and means for stabilizing the interface and for controlling contact between the electrode and the electrolyte.

The cell is normally operated by heating the electrolyte to above a melting point thereof. The means for stabilizing and for controlling permits conduction of lithium ions between the electrode and the electrolyte when the electrolyte is molten.

The electrolyte preferably is a salt or salt mixture, includes nitrate moieties, and has a melting point between about 100° C. to about 170° C.

In a further aspect of the present invention a method of processing lithium may comprise the steps of providing an electrolyte including lithium nitrate, contacting the electrolyte with elemental lithium, and selectively conducting lithium ions between the electrolyte and the elemental lithium.

This invention provides an electrochemical cell which may be operated at temperatures in the range of about 100 to about 170 degrees centigrade. Additionally, the preferred electrolyte is stable at positive potentials between about 2.5 volts to about 4.3 volts with respect to lithium. This means that a wide variety of positive electrode reactants, many of which are known to be suitable in both high temperature molten salt cell and room temperature cells, can be utilized in such an electrochemical cell.

The referred electrolyte and lithium electrode of the present invention may also be used in a variety of electrochemical cells, for example in primary batteries and cells for the purpose of preparing lithium of high purity, or for the extraction of lithium from the electrolyte itself. This latter application may be utilized for the recycling of lithium from other battery or fuel cell systems.

BRIEF DESCRIPTION OF THE DRAWINGS

The accompanying drawing, which is incorporated in and forms a part of the specification, illustrates an electrochemical cell embodiment of the present invention and, together with the description, serves to explain the principles of the invention.

In the drawing.

DETAILED DESCRIPTION OF THE INVENTION

Figure 1:
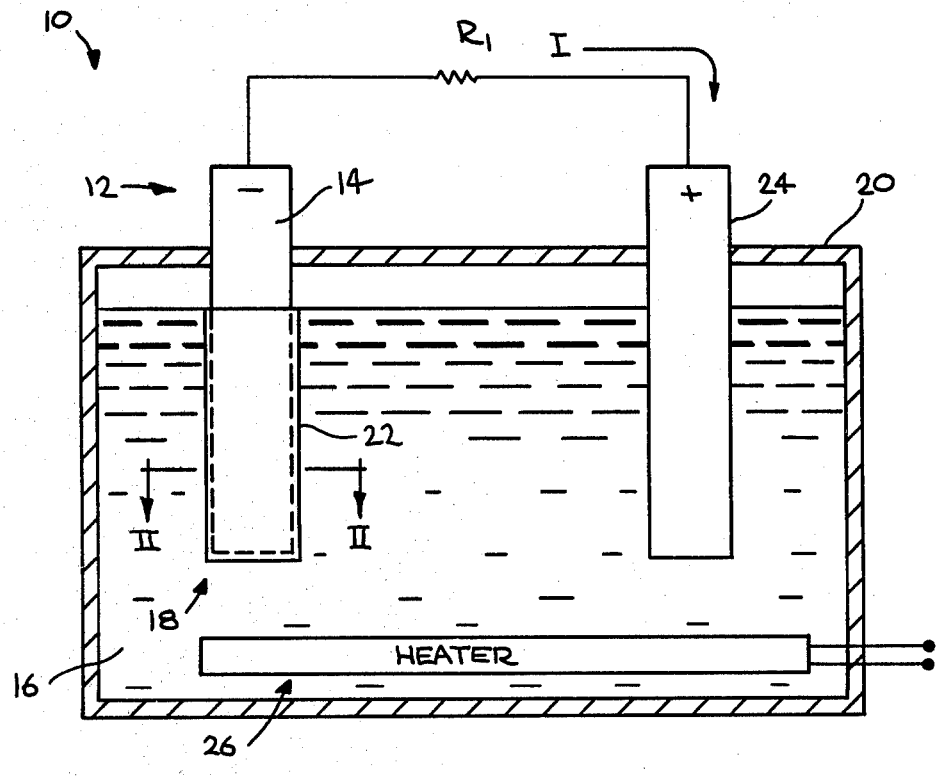
FIG. 1 is a side elevational view, in cross-section, of an embodiment of the present invention; and, FIG. 2 is a cross-sectional view taken along lines II—II of FIG. 1.
Figure 2:
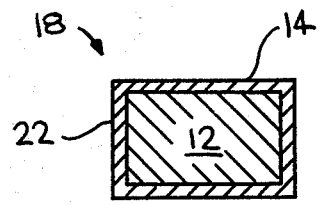

Referring to FIG. 1, a cell 10 includes an electrode 12 which defines a surface 14. Electrode 12 is normally a substantially solid member which may be formed of metallic lithium or which may be formed of a lithium alloy such as, for example, a two-phase mixture of aluminum and beta lithium-aluminum. Surface 14 will normally thus simply be the exterior of electrode 12 with elemental lithium being exposed along surface 14. No special treatment of surface 14 is normally necessary.

It should be understood that electrode 12 may be a variety of shapes or configurations, and as is further described hereinafter, electrode 12 may be liquid rather than solid.

Cell 10 further comprises a salt, or a salt mixture, 16 which is disposed about surface 14 and is a spaced distance therefrom. This spaced distance defines an interface 18 between surface 14 and the salt, or salt mixture 16. The salt, or salt mixture, 16 shall hereinafter be referred to as electrolyte 16.

Electrolyte 16 includes nitrate moieties and also preferably includes a lithium salt, more preferably lithium nitrate. In the best mode contemplated for practice of the present invention electrolyte 16 has a melting point of from about 100° C. to about 170° C., more preferably of from about 100° C. to about 150° C., and most preferably of about 130° C. to about 135° C.

The melting point of lithium is about 175° C.–180° C., and the melting point of lithium nitrate is about 265° C. Where electrolyte 16 has a melting point of less than the melting point for lithium, then cell 10 may be operated in a very favorable range because water can be used as a temperature control medium, and corrosion processes are much less of a problem than at higher temperatures. Thus, for example, a container 20 for cell 10 may be formed of a variety of materials, and may even include many plastics. This relatively low temperature of operation also reduces problems related to insulation, heat loss and safety as compared to prior art, high temperature molten salt electrochemical cells.

It is known that lithium is normally unstable in oxidizing environments, and particularly that liquified lithium can violently react with nitrates. However, solid lithium has been discovered to react with an oxidizing species of electrolyte 16 so as to form a coherent, protective layer 22. Layer 22 functions to stabilize interface 18 and to control the contact between the lithium of surface 14 and the nitrate noieties of electrolyte 16. Further, layer 22 reduces corrosion of electrode 12 under open circuit conditions. Further, layer 22 allows operation of electrochemical cell 10 at voltages greater than the stability range of the electrolyte 16.

Layer 22 is believed to be lithium oxide. Layer 22 is normally of a thickness of from about 10 angstroms to about 100 angstroms and has the property of permitting conduction of lithium ions between electrolyte 16 and electrode 12 while substantially isolating electrode 12 from electrolyte 16 when electrolyte 16 is in a molten state. Such isolation is, for example, advantageous in that layer 22 acts as a barrier to impurities which may be present in electrolyte 16 such as, for example, iron ions. Layer 22 is believed to have an anti-fluorite crystal structure, and has been found to reach a stable, steady state during normal operations of cell 10. The properties of layer 22 are particularly surprising since it is known that potassium oxide and sodium oxide dissolve in similar molten electrolyte compositions.

A variety of species may be utilized in conjunction with lithium nitrate in order to lower the melting point of electrolyte 16. Normally, such other species will include oxidizing species such as nitrates, nitrites, borates, sulfates, and phosphates. Particularly preferred are other nitrate salts, such as for example potassium nitrate, ammonium nitrate, barium nitrate and mixtures thereof. A particularly preferred composition for electrolyte 16 is a eutectic of about 41 mole percent lithium nitrate and about 59 mole percent potassium nitrate. This eutectic composition has a melting point of about 133° C. However, it is believed that other constituents could be advantageously added to the electrolyte composition 16 in order to reduce the melting point, and therefore to reduce the operating temperature of electrolyte 16 in cell 10.

Additionally, it is believed possible to be able to operate cell 10 above the melting point of lithium. For example, the functions of permitting conduction of lithium ions between electrolyte 16 and electrode 12 while substantially isolating electrode 12 from electrolyte 16 may be achieved where layer 22 provides mechanical stabilization at interface 18 in order to control the contact between electrode 12 in a liquid state and electrolyte 16; however, layer 22 must be permeable to ionic lithium.

Cell 10 may be a half cell, but normally will include another, or second, electrode 24 so as to be a complete, or electrochemical, cell. Second electrode 24 is spaced from first electrode 12 and contacts electrolyte 16. The material which forms second electrode 24 may be chosen from a wide variety of materials, and the particular choice primarily depends upon the use to be made of cell 10 (hereinafter generally referred to as electrochemical cell 10 when second electrode 24 is included). If one wishes that electrochemical cell 10 be rechargeable, then second electrode 24 will be selected from a material having a potential with respect to first electrode 12 of between about 2.5 volts to about 4.3 volts. Suitable materials will normally function during operation of electrochemical cell 10 by permitting incorporation of lithium into the crystal structure of such materials. For example, suitable materials for second electrode 24 when electrochemical cell 10 is to be rechargeable are oxides of Cr, V, Mo and Mn, such as $CrO_3$, $V_6O_{13}$, $V_2O_5$, $MoO_3$, and $MnO_2$. A particularly preferred material for second electrode 24, when electrochemical cell 10 is to be rechargeable, is $V_2O_5$.

On the other hand, where electrochemical cell 10 is to be non-rechargeable, then second electrode 24 will be formed of a chemically inert material; that is, chemically inert with respect to lithium ions unlike the just-described rechargeable electrochemical cell 10. Suitable inert materials for second electrode 24, for example, include ruthinium, rhodium, iridium, palladium, platinum, and carbon. Carbon having a high surface area is a particularly preferred inert material. The overall reaction of electrochemical cell 10 when non-rechargeable is: $2Li_{(s)} + NO_3^- = NO_2^- + Li_2O_{(s)}$. The nitrite ion is soluble in the melt, but the lithium oxide is relatively insoluble. The theroetical specific energy of this primary cell, assuming a discharge voltage of 2.5 volts, is 1316 Wh/kg. At a more usual discharge voltage of 2 volts, the theoretical specific energy is 1053 Wh/kg.

With either the above-described rechargeable or non-rechargeable electrochemical cell 10, a method of processing lithium in accordance with the present invention may be performed as follows.

A quantity of an electrolyte, such as the above-described electrolyte 16, is provided which includes lithium moieties and nitrate moieties. The electrolyte 16 is contacted with a quantity of elemental lithium, such as when electrode 12 is at least partially immersed into electrolyte 16 with elemental lithium at surface 14 exposed thereto. Electrolyte 16, either prior to such contacting or during such contacting, is heated beyond its melting point so as to form a molten state of electrolyte 16. Such heating may be by a variety of conventional means 26 well known to the art. Electrolyte 16 is maintained in the molten state during operation of electrochemical cell 10 while lithium ions are selectively conducted between electrolyte 16 and electrode 12.

As has been previously described, when the lithium at surface 14 of electrode 12 contacts the molten electrolyte 16 including lithium nitrate, then layer 22 is stably and coherently formed, and layer 22 is permeable to, or conducts, lithium ions between electrolyte 16 and the lithium of electrode 12.

The method in accordance with the present invention may be used to purify lithium by making use of its selective transport through layer 22, or alternatively could be utilized to produce elemental lithium by the electrolysis of lithium nitrate and related melts. In summary, the present invention provides an electrochemical cell which may be operated at moderate temperatures, the electrolyte thereof is readily available, needs no expensive purifications, and has a wide range of electrochemical stability.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of processing lithium comprising the steps of:

providing a quantity of an electrolyte, said electrolyte including lithium moieties and a mixture of nitrate moieties, and said electrolyte having a melting point in the range of about 100° to about 170° C.;

contacting said electrolyte with a quantity of elemental lithium; and, selectively conducting lithium ions between said quantity of electrolyte and said quantity of elemental lithium heating said quantity of electrolyte to a temperature in the range of about 100° to about 170° C. to form a molten state thereof, and maintaining said temperature and said molten state during the selectively conducting step.

2. The method as in claim 1 wherein the temperature is maintained in the range of about 100° to about 150° C.

3. The method as in claim 1 wherein the nitrate moieties are a mixture of about 41% lithium nitrate and about 59% potassium nitrate and the temperature is maintained in the range of about 130° to about 135° C.

* * * * *